(12) United States Patent
Mizuno

(10) Patent No.: US 6,324,329 B1
(45) Date of Patent: Nov. 27, 2001

(54) PHOTOCATALYST EXCITATION APPARATUS

(75) Inventor: Shinichi Mizuno, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/384,770

(22) Filed: Aug. 27, 1999

(30) Foreign Application Priority Data

Aug. 28, 1998 (JP) .................................................. 10-242403

(51) Int. Cl.$^7$ ...................................................... G02B 6/10
(52) U.S. Cl. .............................. 385/131; 385/14; 385/37; 385/129
(58) Field of Search ................................. 385/14, 15, 37, 385/129–132

(56) References Cited

U.S. PATENT DOCUMENTS

| | | | | |
|---|---|---|---|---|
| 3,871,742 | * | 3/1975 | Kaminow et al. | 385/37 |
| 4,073,675 | * | 2/1978 | Ballman et al. | 117/3 |
| 4,453,801 | * | 6/1984 | Verber et al. | 385/130 |
| 4,468,084 | * | 8/1984 | Hutcheson et al. | 385/14 |
| 4,728,166 | * | 3/1988 | Turner et al. | 385/132 |
| 4,760,569 | * | 7/1988 | Mahlein | 359/114 |
| 5,444,567 | * | 8/1995 | Kataoka | 359/319 |
| 5,452,385 | * | 9/1995 | Izumi et al. | 385/37 |
| 5,568,574 | * | 10/1996 | Tanguay, Jr. et al. | 385/14 |
| 6,078,717 | * | 6/2000 | Nashimoto et al. | 385/130 |
| 6,108,476 | * | 8/2000 | Iimura | 385/128 |

FOREIGN PATENT DOCUMENTS

| | | |
|---|---|---|
| 0 737 513 | 10/1996 | (EP) . |
| 0 838 432 | 4/1998 | (EP) . |
| 06 130250-A | * 5/1994 | (JP) . |
| 09-38503 | * 2/1997 | (JP) . |
| 09-180521 | * 7/1997 | (JP) . |
| 10-71322 | * 3/1998 | (JP) . |
| 10 122671 | 5/1998 | (JP) . |
| 10 202110 | 8/1998 | (JP) . |
| 10-202110 | * 8/1998 | (JP) . |
| 11-33091 | * 2/1999 | (JP) . |
| WO 96/38212 | 12/1996 | (WO) . |

\* cited by examiner

*Primary Examiner*—Akm E. Ullah
*Assistant Examiner*—Michelle R. Connelly-Cushwa
(74) *Attorney, Agent, or Firm*—Sonnenschein, Nath & Rosenthal

(57) ABSTRACT

A photocatalyst excitation apparatus includes a substrate, a light guide layer formed on the substrate, a light source for emitting excitation light for a photocatalyst towards the light guide layer, and a photocatalyst layer formed on the light guide layer. The excitation light emitted from the light source passes through the light guide layer and the leakage light from the light guide layer activates the photocatalyst layer. The light source comes into close contact with the end face of the light guide layer. The photocatalyst excitation apparatus effectively uses the optical power of the light source, shows stable photocatalytic effects having high efficiency, does not require an independent space for the placement causing restriction of use, and prevents adverse effects of ultraviolet light on human bodies.

13 Claims, 6 Drawing Sheets

PHOTOCATALYST EXCITATION APPARATUS

RELATED APPLICATION DATA

The present application claims priority to Japanese Application No. P10-242403 filed Aug. 28, 1998 which application is incorporated herein by reference to the extent permitted by law.

BACKGROUND OF THE INVENTION

1. Field of the Invention

The present invention relates to photocatalyst excitation apparatuses.

2. Description of the Related Art

Conventional photocatalyst materials showing catalytic functions by irradiation of light include titanium dioxide, tungsten oxide, vanadium oxide, zirconium oxide, zinc oxide, zinc sulfide, and tin oxide. Recently, titanium dioxide ($TiO_2$) has attracted attention due to high oxidative decomposition ability, antifouling properties, and hydrophobicity thereof.

Photocatalyst excitation apparatuses using such photocatalysts have various structures depending on the use. In general, as shown in FIG. 6, a $TiO_2$ photocatalyst layer 82 is formed on a substrate 80 composed of a tile, glass or plastic and is irradiated with excitation light 84 for the photocatalyst, such as ultraviolet light, from the upper side.

When the $TiO_2$ photocatalyst layer 82 is irradiated with the excitation light 84, electrons are excited by the photoelectric effect so that electrons and holes are generated and migrate to the surface of the $TiO_2$ photocatalyst layer 82. Electrons reduce oxygen in air to form superoxide ions ($O_2^-$), whereas holes degrade water adsorbed on the surface to form hydroxyl radicals (.OH). The superoxide ions and hydroxyl radicals are called activated oxygen species and show strong oxidizing effects.

When organic contaminants adhere to the $TiO_2$ photocatalyst layer 82, superoxide ions deprive the organic compound of carbon whereas hydroxyl radicals deprive the organic compound of hydrogen to decompose the organic compound. The decomposed carbon and hydrogen are oxidized to form carbon dioxide and water. Oxidative decomposition of and antifouling properties to organic substances are thereby shown.

In the above conventional photocatalyst excitation apparatus, solar light containing ultraviolet light or ultraviolet light emitted from an artificial light source is used as the excitation light 84 which is incident on the photocatalyst layer 82.

Since a light source separately placed at the exterior of the photocatalyst excitation apparatus is used in such a case, the excitation light 84 may be absorbed or scattered in media such as air and moisture which are present between the light source and the $TiO_2$ photocatalyst layer 82. Thus, the excitation light 84 for the photocatalyst may be attenuated when it reaches the $TiO_2$ photocatalyst layer 82. Accordingly, the optical power from the light source is not effectively used.

When solar light is used as the excitation light 84, the luminous power of the solar light significantly depends on the weather out of doors, and the solar light is shaded or diminished indoors. Thus, the $TiO_2$ photocatalyst layer 82 does not stably work as the photocatalyst.

When a nondirectional light source such as a fluorescent lamp is used as the light source of the excitation light 84, some part of the light is scattered and is not incident on the $TiO_2$ photocatalyst layer 82. Thus, the optical power of the light source is not effectively used. When a highly directional light source such as a semiconductor laser or a light emitting diode (LED) is used, mismatch of the irradiating zone of the light source and the position of the $TiO_2$ photocatalyst layer 82 causes dissipation of the light from the light source to regions other than the $TiO_2$ photocatalyst layer 82. Thus, the optical power of the light source also cannot be effectively used.

When an ultraviolet light source is used as the light source for the excitation light, which is radiated towards regions other than the $TiO_2$ photocatalyst layer 82, may reach the eyes and skin. Thus, the effects on human bodies, particularly the possibility of melanoma carcinogenesis concerns. When the photocatalyst excitation apparatus is used in products, in which people view for a long time, such as a Braun-tube screen of a television set and a windshield of an automobile, the above hazards will be severe problems.

When an artificial light source is used as the light source for the excitation light, a space is required for independently placing the light source. Thus, the possibility of the use of the photocatalyst excitation apparatus is limited and the esthetics thereof may be deteriorated.

In general, the activity of the catalyst increases as the thickness of the $TiO_2$ photocatalyst layer 82 increases. When light with a wavelength which has large absorption in the $TiO_2$ photocatalyst layer 82 is used as the excitation light 84, the light is absorbed in a shallow region near the surface of the $TiO_2$ photocatalyst layer 82, and thus uniform excitation is not achieved in the deep region. When light with a wavelength which has small absorption in the $TiO_2$ photocatalyst layer 82 is used as the excitation light 84, the $TiO_2$ photocatalyst layer 82 is uniformly excited from the surface to the deep region, but the excitation efficiency is not high due to low light absorption. Accordingly, even if the thickness of the $TiO_2$ photocatalyst layer 82 is sufficiently increased to enhance the activity, the increased thickness is not effectively used in any case.

SUMMARY OF THE INVENTION

It is an object of the present invention to provide a photocatalyst excitation apparatus which can effectively use the optical power of a light source, shows stable photocatalytic effects having high efficiency, does not require an independent space for the placement causing restriction of use, and can prevent adverse effects of ultraviolet light on human bodies.

A first aspect of the present invention is a photocatalyst excitation apparatus including a substrate, a light guide layer formed on the substrate, a light source for emitting excitation light for a photocatalyst towards the light guide layer, and a photocatalyst layer formed on the light guide layer, the excitation light emitted from the light source passing through the light guide layer and the leakage light from the light guide layer activating the photocatalyst layer, wherein the light source comes into close contact with the end face of the light guide layer.

In the first aspect, the light guide layer is formed on the substrate, and the photocatalyst layer is formed on the light guide layer. When the substrate used transmits the excitation light and has a smooth surface compared to the wavelength of the excitation light for the photocatalyst, the layered configuration of the substrate, the light guide layer, the photocatalyst layer, and an air layer in contact with the photocatalyst layer can be considered to be a multimodal four-layer step-type slab light guide. Thus, the excitation light incident on the light guide layer passes through the light guide layer and leaks from the light guide layer to illuminate the entire rear face of the photocatalyst layer. Since the illuminating light travels through a long distance in the photocatalyst layer, the overall photocatalyst layer is activated with high efficiency.

Since the light source comes into close contact with the end face of the light guide layer, the excitation light emitted from the light source is effectively incident on the light guide layer. Since there is no medium such as air or moisture between the light source and the photocatalyst layer, there is no loss of the luminous power due to light absorption and scattering in the medium. Thus, the apparatus can significantly effectively use the optical power of the light source. When a material absorbing less of the excitation light is used for the light guide layer, the loss of the luminous power due to light absorption in the light guide layer is reduced.

Since external environments do not affect this apparatus, unlike the use of solar light as the excitation light, the photocatalyst layer shows stable photocatalytic effects.

When ultraviolet light is used as the excitation light, this apparatus has a structure which can confine the excitation light from the light source towards the photocatalyst layer. Thus, the excitation light does not leak to the exterior, except for light scattered by dust adhered to the surface of the photocatalyst layer. When the photocatalyst excitation apparatus is used in products, in which people view for a long time, such as a Braun-tube screen of a television set and a windshield of an automobile, the effects on human bodies, and particularly the probability of melanoma carcinogenesis will be negligible.

Since the light source comes into close contact with the end face of the light guide layer and is integrated with the substrate and the photocatalyst layer in the apparatus, no space for independently placing the light source is required. The overall apparatus can be made compact, the usable range of the photocatalyst excitation apparatus is expanded, and the esthetics thereof is substantially maintained.

A second aspect in accordance with the present invention is a photocatalyst excitation apparatus including a substrate, a light guide layer formed on the substrate, a light source for emitting excitation light for a photocatalyst towards the light guide layer, and a photocatalyst layer formed on the light guide layer, the excitation light emitted from the light source passing through the light guide layer and the leakage light from the light guide layer activating the photocatalyst layer, wherein the light source is placed on the photocatalyst layer, and the excitation light from the light source is incident on the light guide layer through a prism placed in contiguity with the light source on the photocatalyst.

In the second aspect, the light guide layer and the photocatalyst layer are deposited on the substrate in that order. When the substrate transmits the excitation light and has a smooth surface compared to the wavelength of the excitation light for the photocatalyst, as in the photocatalyst excitation apparatus of the first aspect, the excitation light incident on the light guide layer from the light source passes through the light guide layer and leaks from the light guide layer to illuminate the entire rear face of the photocatalyst layer. Accordingly, the illuminating light travels through a long distance in the photocatalyst layer to activate the overall photocatalyst layer with high efficiency.

Since the light source is placed on the light guide layer, the excitation light for the photocatalyst emitted from the light source is effectively incident on the light guide layer through the prism placed in contiguity with the light source on the photocatalyst, as in the photocatalyst excitation apparatus in accordance with the first aspect. There is no medium such as air or moisture between the light source and the photocatalyst layer, and a material absorbing less of the excitation light for the photocatalyst can be selected for the light guide layer. Thus, the optical power of the light source can be significantly effectively used. Since external environments do not affect this apparatus, unlike the use of solar light as the excitation light, the photocatalyst layer shows stable photocatalytic effects. Since the excitation light, such as ultraviolet light, does not substantially leak to the exterior, the effects on human bodies will be negligible. Since no space for independently placing the light source is required, the usable range of the photocatalyst excitation apparatus is expanded and the esthetics thereof is substantially maintained.

A third aspect in accordance with the present invention is a photocatalyst excitation apparatus including a substrate, a light guide layer formed on the substrate, a light source for emitting excitation light for a photocatalyst towards the light guide layer, and a photocatalyst layer formed on the light guide layer, the excitation light emitted from the light source passing through the light guide layer and the leakage light from the light guide layer activating the photocatalyst layer, wherein the light source comes into close contact with the end face of the substrate with a prism provided therebetween, the excitation light emitted from the light source is incident on the light guide layer through the prism.

In the photocatalyst excitation apparatus of the third aspect, the light guide layer and the photocatalyst layer are deposited on the substrate in that order. When the substrate transmits the excitation light for the photocatalyst and has a smooth surface compared to the wavelength of the excitation light for the photocatalyst, as in the photocatalyst excitation apparatus of the first aspect, the excitation light incident on the light guide layer passes through the light guide layer and leaks from the light guide layer to illuminate the entire rear face of the photocatalyst layer. The illuminating light travels through a long distance in the photocatalyst layer to activate the overall photocatalyst layer with high efficiency.

Since the light source comes into close contact with the end face of the substrate with a prism provided therebetween, the excitation light emitted from the light source is effectively incident on the light guide layer through the prism, as in the photocatalyst excitation apparatus of the first aspect. There is no medium such as air or moisture between the light source and the photocatalyst layer, and a material absorbing less of the excitation light can be selected for the light guide layer. Thus, the optical power of the light source can be significantly effectively used. Since external environments do not affect this apparatus, unlike the use of solar light as the excitation light, the photocatalyst layer shows stable photocatalytic effects. Since the excitation light, such as ultraviolet light, does not substantially leak to the exterior, the effects on human bodies will be negligible. Since no space for independently placing the light source is required, the usable range of the photocatalyst excitation apparatus is expanded and the esthetics thereof is substantially maintained.

In the photocatalyst excitation apparatus according to either the second or third aspect, one of the substrate, the light guide layer and the photocatalyst layer may be provided with a grating, and the excitation light emitted from the light source is diffracted by the grating and is incident on the light guide layer. When the excitation light emitted from the light source is incident on the light guide layer through the photocatalyst layer or when the excitation light is incident on the end face of the substrate and then incident on the light guide layer through the substrate, the excitation light from the light source is readily and stably conducted into the light guide layer.

Herein, the phrasing "one of the substrate, the light guide layer and the photocatalyst layer is provided with a grating" includes a case in which the layer itself has the grating and a case in which the grating is formed at the interface between any two layers.

In the photocatalyst excitation apparatus according to any one of the first to third aspects, the light source is preferably selected from a semiconductor laser and a light emitting diode. Highly directional light is emitted from the semiconductor laser or the light emitting diode, and the position and the direction of the light source can be aligned with high accuracy with respect to the photocatalyst layer for receiving the light. Thus, the excitation light can be readily and stably incident on the light guide layer with high efficiency, and the optical power is effectively used. Since the excitation light coherently passes through the light guide layer and the leaked light illuminates the photocatalyst layer, the luminance is high compared to direct illumination of the surface of the photocatalyst layer as in conventional methods. Accordingly, the photocatalyst layer is activated with high efficiency even if a light source having a low optical power, such as a semiconductor laser or a light emitting diode, is used.

A fourth aspect of the present invention is a photocatalyst excitation apparatus comprising a substrate, a light guide layer formed on the substrate, a light source for emitting excitation light for a photocatalyst towards the light guide layer, and a photocatalyst layer formed on the light guide layer, the excitation light emitted from the light source passing through the light guide layer and the leakage light from the light guide layer activating the photocatalyst layer, wherein a first buffer layer transmitting the excitation light and having a refractive index which is lower than that of the light guide layer may be disposed between the substrate and the light guide layer.

In the photocatalyst excitation apparatus in accordance with the fourth aspect, a first buffer layer transmitting the excitation light and having a refractive index which is lower than that of the light guide layer is disposed between the substrate and the light guide layer. When the substrate used is opaque and does not transmit the excitation light or does not have a smooth surface compared to the wavelength of the excitation light for the photocatalyst, the layered configuration of the first layer, the light guide layer and the photocatalyst layer, and an air layer in contact with the photocatalyst layer can be considered to be a multimodal four-layer step-type slab light guide. Thus, the excitation light incident on the light guide layer passes through the light guide layer and leaks from the light guide layer to illuminate the entire rear face of the photocatalyst layer. Since the illuminating light travels through a long distance in the photocatalyst layer, the overall photocatalyst layer is activated with high efficiency.

In the photocatalyst excitation apparatus according to the fourth aspect, one of the substrate, the first buffer layer, the light guide layer and the photocatalyst layer is provided with a grating, and the excitation light emitted from the light source is diffracted by the grating and is incident on the light guide layer. Thus, the excitation light is readily and stably introduced into the light guide layer, when the excitation light emitted from the light source is incident on the light guide layer through the photocatalyst layer or is incident on the side end of the substrate and then on the light guide layer through the substrate.

Herein, the phrasing "one of the substrate, the first buffer layer, the light guide layer and the photocatalyst layer is provided with a grating" includes a case in which the layer itself has the grating and a case in which the grating is formed at the interface between any two layers.

A fifth aspect of the present invention is a photocatalyst excitation apparatus including a substrate, a light guide layer formed on the substrate, a light source for emitting excitation light for a photocatalyst towards the light guide layer, and a photocatalyst layer formed on the light guide layer, the excitation light emitted from the light source passing through the light guide layer and the leakage light from the light guide layer activating the photocatalyst layer, wherein a second buffer layer transmitting the excitation light for the photocatalyst and comprising an nonoxidizing material is disposed between the light guide layer and the photocatalyst layer.

In the photocatalyst excitation apparatus in accordance with the fifth aspect, a second buffer layer transmitting the excitation light and comprising an nonoxidizing material is disposed between the light guide layer and the photocatalyst layer. When a highly oxidative photocatalyst layer, such as a $TiO_2$ photocatalyst layer is used, the light guide layer is protected from oxidation by the photocatalyst layer. Thus, deterioration of the photocatalyst excitation apparatus is prevented and the apparatus has a prolonged service life.

In the photocatalyst excitation apparatus according to the fifth aspect, one of the substrate, the light guide layer, the second buffer layer and the photocatalyst layer may be provided with a grating, and the excitation light emitted from the light source is diffracted by the grating and is incident on the light guide layer. Thus, the excitation light is readily and stably introduced into the light guide layer, when the excitation light emitted from the light source is incident on the light guide layer through the photocatalyst layer or is incident on the side end of the substrate and then on the light guide layer through the substrate.

Herein, the phrasing "one of the substrate, the light guide layer, the second buffer layer and the photocatalyst layer is provided with a grating" includes a case in which the layer itself has the grating and a case in which the grating is formed at the interface between any two layers.

A sixth aspect of the present invention is a photocatalyst excitation apparatus including a substrate, a light guide layer formed on the substrate, a light source for emitting excitation light for a photocatalyst towards the light guide layer, and a photocatalyst layer formed on the light guide layer, the excitation light emitted from the light source passing through the light guide layer and the leakage light from the light guide layer activating the photocatalyst layer, wherein a third buffer layer transmitting the excitation light, having a thickness which is smaller than or the same as the wavelength of the excitation light is disposed between the light guide layer and the photocatalyst layer.

In the photocatalyst excitation apparatus in accordance with the sixth aspect, a third buffer layer transmitting the excitation light and having a thickness which is smaller than or the same as the wavelength of the excitation light is disposed between the light guide layer and the photocatalyst layer. When the refractive index of the third buffer layer is lower than that of the light guide layer, the excitation light passing through the light guide layer is incident on the photocatalyst layer through the third buffer layer without total reflection at the interface between the light guide layer and the third buffer layer. Since the luminous power of the excitation light is decreased in this process, light absorption in the photocatalyst layer is decreased. Thus, the overall photocatalyst layer is uniformly activated even if the photocatalyst layer has a large area and a large thickness.

Since the refractive index of the third buffer layer is lower than the refractive index of the light guide layer, the luminous power of the excitation light incident on the photocatalyst layer from the third buffer layer can be readily controlled by the thickness of the third buffer layer. Thus, an optimum thickness for uniformly activating the entire photocatalyst layer having a large area and a large thickness can be selected.

In the photocatalyst excitation apparatus according to the sixth aspect, wherein one of the substrate, the light guide layer, the third buffer layer and the photocatalyst layer may be provided with a grating, and the excitation light emitted from the light source is diffracted by the grating and is incident on the light guide layer. Thus, the excitation light is readily and stably introduced into the light guide layer, when the excitation light emitted from the light source is incident on the light guide layer through the photocatalyst layer or is incident on the side end of the substrate and then on the light guide layer through the substrate.

Herein, the phrasing "one of the substrate, the light guide layer, the third buffer layer and the photocatalyst layer is provided with a grating" includes a case in which the layer itself has the grating and a case in which the grating is formed at the interface between any two layers.

In the photocatalyst excitation apparatus in accordance with any one of the first to sixth aspects, the length of the light guide layer may be greater than the thickness of the photocatalyst layer. The luminous power of the excitation light passing through the light guide layer having a relatively large thickness increases, whereas the luminous power of the excitation light passing through the photocatalyst layer having a relatively small thickness decreases. Thus, light absorption in the photocatalyst layer is reduced, and the entire photocatalyst layer is uniformly activated even if the photocatalyst layer has a large area and a large thickness.

In the photocatalyst excitation apparatus according to any one of the first to sixth aspects, the wavelength of the excitation light emitted from the light source is preferably a wavelength near the absorption edge corresponding to the band gap of the photocatalyst layer. Since absorption of the excitation light incident on the photocatalyst layer is reduced in the photocatalyst layer, the entire photocatalyst layer is uniformly activated even if the photocatalyst layer has a large area and a large thickness.

DESCRIPTION OF THE PREFERRED EMBODIMENTS

The embodiments of the present invention will now be described with reference to the attached drawings.

First Embodiment

Figure 1:
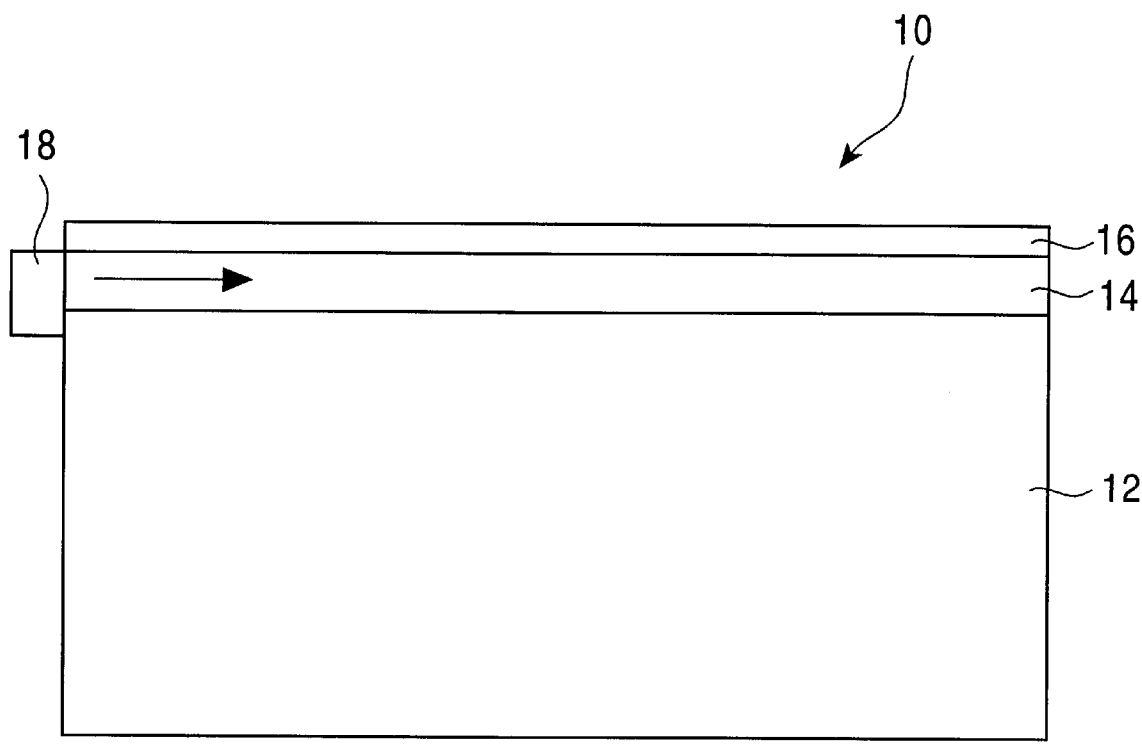
FIG. 1 is a cross-sectional view of a photocatalyst excitation apparatus in accordance with a first embodiment of the present invention.

FIG. 1 is a cross-sectional view of a photocatalyst excitation apparatus in accordance with a first embodiment of the present invention. In a photocatalyst excitation apparatus 10, a $Ta_2O_5$ light guide layer 14 is formed on a transparent synthetic quartz substrate 12, and an anatase $TiO_2$ photocatalyst layer 16 is formed on the $Ta_2O_5$ light guide layer 14. A GaN semiconductor laser 18 as a light source is placed so that its radiating aperture comes into close contact with the end face of the $Ta_2O_5$ light guide layer 14.

Herein, the refractive index of the synthetic quartz substrate 12 is 1.5, the refractive index of the $Ta_2O_5$ light guide layer 14 is 1.9 to 2.2, and the refractive index of the $TiO_2$ photocatalyst layer 16 is 2.5. Thus, a layered structure including the synthetic quartz substrate 12, the $Ta_2O_5$ light guide layer 14 and the $TiO_2$ photocatalyst layer 16, and an air layer in contact with the $TiO_2$ photocatalyst layer 16 can be considered to be a four-layer step-type slab light guide.

Since the activity of the $TiO_2$ photocatalyst layer 16 decreases as the thickness decreases, the thickness is preferably large. Since the $TiO_2$ photocatalyst layer 16 formed by a sol-gel process is a deposit of ultrafine particles, a significantly large thickness causes large optical loss due to increased light scattering. Thus, the thickness of the $TiO_2$ photocatalyst layer 16 is increased unless light scattering is noticeable.

The thickness of the $Ta_2O_5$ light guide layer 14 is set to be higher than the thickness of the $TiO_2$ photocatalyst layer 16. Thus, the luminous power in the $Ta_2O_5$ light guide layer 14 is relatively high whereas the luminous power of the excitation light incident on the $TiO_2$ photocatalyst layer 16 is relatively low, when the excitation light passes through the $Ta_2O_5$ light guide layer 14. The $Ta_2O_5$ light guide layer 12 is formed by a chemical vapor deposition (CVD) process or a sputtering process. The $TiO_2$ photocatalyst layer 16 is formed by a sol-gel film-forming process.

The operation of the photocatalyst excitation apparatus 10 shown in FIG. 1 will now be described. From the GaN semiconductor laser 18 in close contact with the $Ta_2O_5$ light guide layer 14, light having a wavelength near the absorption end corresponding to the band gap of the $TiO_2$ photocatalyst layer 16, that is, light having a wavelength of approximately 400-nm is emitted as excitation light for the photocatalyst and is incident on the $Ta_2O_5$ light guide layer 14 in close contact with the radiating aperture. The excitation light incident on the $Ta_2O_5$ light guide layer 14 passes through the $Ta_2O_5$ light guide layer 14, which is considered to be a four-layer step-type slab light guide as a whole, in the direction of the arrow in FIG. 1.

Propagation of the excitation light, which is incident on the $Ta_2O_5$ light guide layer 14, will be described in more detail below. The excitation light passes through the $Ta_2O_5$ light guide layer 14 while repeating total reflection at the interfaces between the $TiO_2$ photocatalyst layer and the air layer and between the $Ta_2O_5$ light guide layer and the synthetic quartz substrate. The excitation light passing through the $Ta_2O_5$ light guide layer 14 does not attenuate in principle, except for attenuation due to light absorption, and thus passes through a sufficiently long distance.

The leakage light from the $Ta_2O_5$ light guide layer 14 is incident on the $Ta_2O_2$ photocatalyst layer 16. That is, the entire rear face, in contact with the $Ta_2O_5$ light guide layer 14, of the $TiO_2$ photocatalyst layer 16 is irradiated with the excitation light with a wavelength of approximately 400 nm. The $TiO_2$ photocatalyst layer 16 absorbs the excitation light and is activated. Thus, it has oxidative decomposition ability and an antifouling properties against organic compounds due to photocatalytic effects.

As described above, the entire rear face of the $TiO_2$ photocatalyst layer 16 is irradiated with the excitation light which leaks from the $Ta_2O_5$ light guide layer 14. Thus, the excitation light travels through a long distance of the $TiO_2$ photocatalyst layer 16. Accordingly, the $TiO_2$ photocatalyst layer 16 overall can be activated with high efficiency.

The distance of the excitation light passing through the $TiO_2$ photocatalyst layer 16 is extraordinarily large compared with a conventional case in which the excitation light is perpendicularly incident on the $TiO_2$ photocatalyst layer 16. Furthermore, light absorption in the $TiO_2$ photocatalyst layer 16 is large. Thus, excitation light having a conventional wavelength may not sufficiently activate the $TiO_2$ photocatalyst layer 16 having a large area due to significantly high light absorption. In this embodiment, this problem is solved by the following two countermeasures.

First, the thickness of the $Ta_2O_5$ light guide layer 14 is larger than the thickness of the $TiO_2$ photocatalyst layer 16 so that the luminous power of the excitation light incident on the $TiO_2$ photocatalyst layer 16 is relatively low. Thus, light absorption in the $TiO_2$ photocatalyst layer 16 is decreased. The entire $TiO_2$ photocatalyst layer 16 can, therefore, be uniformly activated with high efficiency even if it has a large area and a large thickness. Second, the wavelength of the excitation light for the photocatalyst emitted from the GaN semiconductor laser 18 is set to be approximately 400 nm, that is, a wavelength near the absorption end corresponding to the band gap of the $TiO_2$ photocatalyst layer 16. Thus, light absorption in the $TiO_2$ photocatalyst layer 16 is decreased. The entire $TiO_2$ photocatalyst layer 16 can, therefore, be uniformly activated with high efficiency even if it has a large area and a large thickness.

The intensity of the light passing through the $Ta_2O_5$ light guide layer 14 increases in inverse proportion to the thickness thereof; hence, the intensity of the excitation light on the $TiO_2$ photocatalyst layer 16 from the $Ta_2O_5$ light guide layer 14 is higher than that of the light, which is perpendicularly incident on the $TiO_2$ photocatalyst layer 16 as in a conventional apparatus, having the same luminous power. Accordingly, a light source having a low output, such as the GaN semiconductor laser 18, can sufficiently activate the $TiO_2$ photocatalyst layer 16 having a large area and a large thickness.

Since the GaN semiconductor laser 18 comes into close contact with the end face of the $Ta_2O_5$ light guide layer 14, the highly directional excitation light emitted from the GaN semiconductor laser 18 is incident on the $Ta_2O_5$ light guide layer 14 without loss. Since there is no medium causing light absorption or scattering, such as air or moisture, between the GaN semiconductor laser 18 and the $Ta_2O_5$ light guide layer 14, the optical power from the GaN semiconductor laser 18 can be used with significantly high efficiency without loss of the luminous intensity due to light absorption and scattering.

Since this apparatus is not affected by external environments, unlike the use of solar light as the excitation light for the photocatalyst, the $TiO_2$ photocatalyst layer 16 shows stable photocatalytic effects. This apparatus has a structure which can confine the excitation light from the GaN semiconductor laser 18 towards the $TiO_2$ photocatalyst layer 16, via the $Ta_2O_5$ light guide layer 14. Thus, the excitation light does not leak to the exterior, except for light scattered by dust adhered to the surface of the $TiO_2$ photocatalyst layer 16. When the photocatalyst excitation apparatus 10 is used in products, in which people view for a long time, such as a Braun-tube screen of a television set and a windshield of an automobile, the effects on human bodies, and particularly the probability of melanoma carcinogenesis will be negligible.

Since the GaN semiconductor laser 18 as the light source comes into close contact with the end face of the $Ta_2O_5$ light guide layer 14, it can be embedded in, for example, a Braun tube screen of a television set or a frame of a windshield of an automobile. The photocatalyst excitation apparatus 10, therefore, does not require an independent space for the light source. The photocatalyst excitation apparatus 10 can be made compact, the usable range of the photocatalyst excitation apparatus is expanded, and the esthetics thereof is substantially maintained.

Second Embodiment

Figure 2:
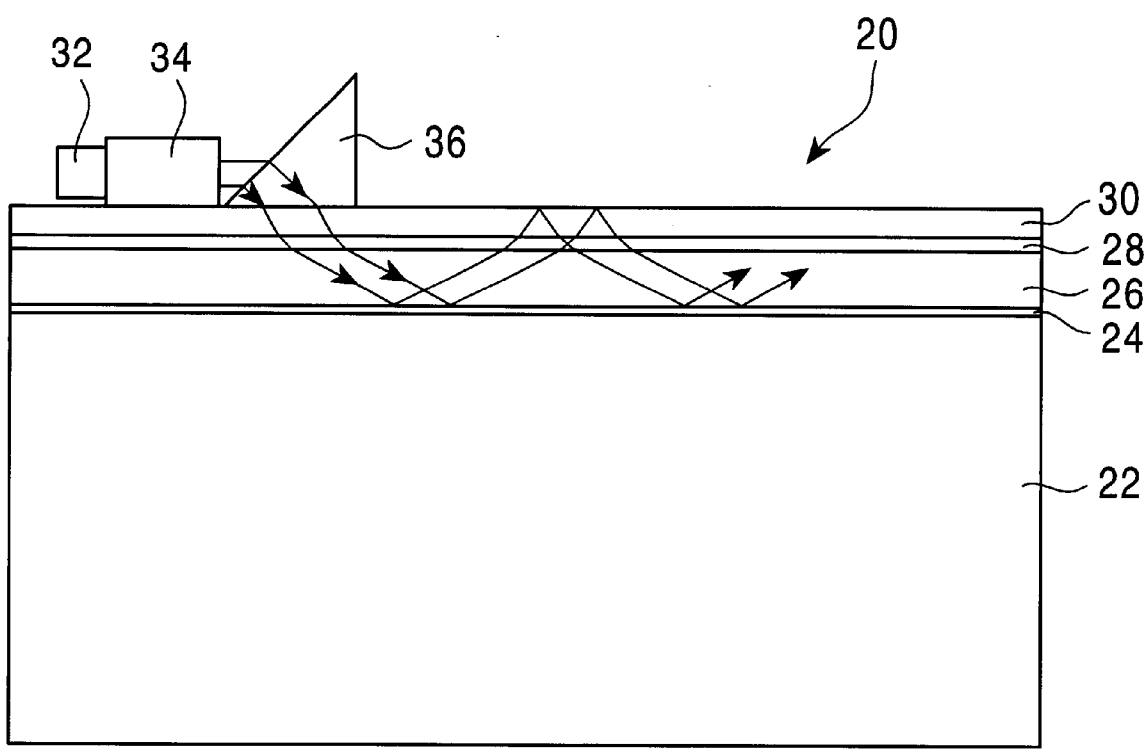
FIG. 2 is a cross-sectional view of a photocatalyst excitation apparatus in accordance with a second embodiment of the present invention.

FIG. 2 is a cross-sectional view of a photocatalyst excitation apparatus in accordance with a second embodiment of the present invention. In a photocatalyst excitation apparatus 20 shown in FIG. 2, a buffer layer 24 which is composed of a perfluoro-compound transmitting the excitation light for the photocatalyst, for example, a copolymer ("Teflon AF" made by DuPont) of tetrafluoroethylene and perfluoro-2,2-dimethyl-1,3-dioxol (PDD) is formed on an opaque ceramic substrate 22 which has surface irregularities larger than the wavelength of the excitation light for the photocatalyst, and the thickness of the buffer layer 24 is sufficiently larger than the wavelength of the excitation light. Although the opaque ceramic substrate 22 does not have a smooth surface, a smooth surface is formed by a transparent buffer layer 24 coated thereon.

A polymethyl methacrylate (PMMA) light guide layer 26 composed of PMMA is formed on the buffer layer 24, and a buffer layer 28 which is composed of an nonoxidizing resin and transmits the excitation light is formed on the PMMA light guide layer 26 so that the thickness of the buffer layer 28 is sufficiently smaller than the wavelength of the excitation light. An anatase $TiO_2$ photocatalyst layer 30 is formed on the buffer layer 28.

Examples of the nonoxidizing resins as materials for the buffer layer 28 includes fluorine resins and silicone resins. An example of the fluorine resin is a copolymer of tetrafluoroethylene and PDD used for the buffer layer 24. Examples of the silicon resin are organosilane resins (containing tetraalkoxysilane or trialkoxysilane as a major component).

A GaN semiconductor laser 32 as a light source is placed on the $TiO_2$ photocatalyst layer 30. A collimating lens 34 is placed on the $TiO_2$ photocatalyst layer 30 so as to come into close contact with the radiating aperture of the GaN semiconductor laser 32. A prism 36 composed of, for example, a rutile $TiO_2$ crystal or a GaN crystal is placed in contiguity with the collimating lens 34 on the $TiO_2$ photocatalyst layer 30.

The refractive index of the buffer layer 24 is lower than the refractive index, 1.6, of the PMMA light guide layer 26, and the refractive index of the buffer layer 28 is lower than the refractive index of the PMMA light guide layer 26. Furthermore, the refractive index of the $TiO_2$ photocatalyst layer 30 is 2.5. Thus, a layered structure including the buffer layer 24, the PMMA light guide layer 26, the buffer layer 28 and the $TiO_2$ photocatalyst layer 30, and an air layer in contact with the $TiO_2$ photocatalyst layer 30 can be considered to be a multimodal five-layer step-type slab light guide.

The thickness of the $TiO_2$ photocatalyst layer 30 is increased unless light scattering is noticeable, as in the first embodiment. The thickness of the PMMA light guide layer 26 is controlled to be larger than the thickness of the TiO$_2$ photocatalyst layer 30.

The buffer layer 24 may be formed by coating a melt or a solution of a perfluoro-compound, followed by air-drying and baking treatment. The PMMA light guide layer 26 may be formed by coating the melt or the solution of PMMA, followed by air-drying and baking treatment. The buffer layer 28 may be formed by coating an organosilane resin, followed by thermal curing at a temperature of 70 to 80° C. The TiO$_2$ photocatalyst layer 30 may be formed by coating a silicone resin as a binder for bonding TiO$_2$ particles, followed by thermal curing at a temperature of 70 to 80° C., as in the buffer layer 28. The coating of these layers are performed by a dip coating process, a spin coating process, a casting process or a lamination process.

The operation of the photocatalyst excitation apparatus 20 shown in FIG. 2 will now be described.

Light having a wavelength near the absorption end corresponding to the band gap of the TiO$_2$ photocatalyst layer 30, that is, light having a wavelength of approximately 400 nm, is emitted as excitation light for the photocatalyst from the radiating aperture of the GaN semiconductor laser 32 placed on the TiO$_2$ photocatalyst layer 30. The light is collimated through the collimating lens 34 and is incident on the prism 36. Since the prism 36 is composed of a rutile TiO$_2$ crystal or a GaN crystal and has a refractive index of 2.7, the excitation light incident on the prism 36 is refracted as shown by the arrow in FIG. 2, and then is incident on the PMMA light guide layer 26 via the TiO$_2$ photocatalyst layer 30 and the buffer layer 28.

The 400-nm excitation light passes through the PMMA light guide layer 26 which is considered to be a five-layer step-type slab light guide. That is, the excitation light passes through the PMMA light guide layer 26 while repeating total reflection on the interfaces between the TiO$_2$ photocatalyst layer 30 and the external air layer and between the PMMA light guide layer 26 an the buffer layer 24. Since the buffer layer 24 disposed between the ceramic substrate 22 and the PMMA light guide layer 26 has a thickness which is sufficiently larger than the wavelength of the excitation light for the photocatalyst and has a smooth surface, the excitation light is totally reflected by the interface with the PMMA light guide layer 26. Since the buffer layer 28 disposed between the PMMA light guide layer 26 and the TiO$_2$ photocatalyst layer 30 has a thickness which is sufficiently smaller than the wavelength of the excitation light for the photocatalyst, the buffer layer 28 can transmit the excitation light for the photocatalyst without total reflection of the excitation light at the interface with the PMMA light guide layer 26 even if the refractive index of the buffer layer 28 is lower than the refractive index of the PMMA light guide layer 26.

The leakage light of the excitation light is incident on the TiO$_2$ photocatalyst layer 30 when the excitation light passes through the PMMA light guide layer 26. That is, the TiO$_2$ photocatalyst layer 30 is irradiated with the 400-nm excitation light from the entire rear face in contact with the PMMA light guide layer 26 with the buffer layer 28 therebetween. The excitation light incident on the TiO$_2$ photocatalyst layer 30 passes through the TiO$_2$ photocatalyst layer 30 while repeating total reflection at the interface between the TiO$_2$ photocatalyst layer 30 and the external air layer.

The TiO$_2$ photocatalyst layer 30 irradiated with the excitation light from the entire rear face absorbs the excitation light and is activated. Thus, it has oxidative decomposition ability and antifouling properties against organic compounds due to photocatalytic effects.

In accordance with this embodiment, the TiO$_2$ photocatalyst layer 30 is irradiated with the excitation light from the entire rear face when the excitation light passes through the PMMA light guide layer 26. Since the excitation light can travel through a long distance in the PMMA light guide layer 26, the TiO$_2$ photocatalyst layer 30 overall can be activated with high efficiency.

The intensity of the excitation light incident on the TiO$_2$ photocatalyst layer 30 from the PMMA light guide layer 26 is higher than that of the light which has the same luminous power and is perpendicularly incident on the TiO$_2$ photocatalyst layer 30, as in a conventional apparatus. Hence, the TiO$_2$ photocatalyst layer 30 having a large area and a large thickness can be sufficiently activated even if a compact light source, such as the GaN semiconductor laser 32, is used.

The buffer layer 24, which transmits the excitation light and has a refractive index lower than that of the PMMA light guide layer 26, is formed between the ceramic substrate 22 and the PMMA light guide layer 26 so that the thickness is sufficiently larger than the wavelength of the excitation light and a smooth interface is formed between the buffer layer 24 and the PMMA light guide layer 26. Since the layered structure including the buffer layer 24 and the PMMA light guide layer 26, therefore, is considered to be a step-type slab light guide, the excitation light passes through the PMMA light guide layer 26. An opaque substrate not transmitting the excitation light, such as the ceramic substrate 22, or a substrate not having a smooth surface compared to the wavelength of the excitation light can be used as a substrate.

Since the buffer layer 28 composed of an nonoxidizing resin is disposed between the PMMA light guide layer 26 and the TiO$_2$ photocatalyst layer 30, the PMMA light guide layer 26 is protected from oxidation by the TiO$_2$ photocatalyst layer 30 having a large oxidative power. Thus, deterioration of the photocatalyst excitation apparatus 20 is prevented and the apparatus has a prolonged service life.

Since the refractive index of the buffer layer 28 is lower than the refractive index of the PMMA light guide layer 26, the intensity of the excitation light incident on the TiO$_2$ photocatalyst layer 30 from the PMMA light guide layer 26 through the buffer layer 28, that is, the irradiation intensity can be readily controlled by adjusting the thickness. For example, the intensity of the excitation light incident on the TiO$_2$ photocatalyst layer 30 decreases as the thickness of the buffer layer 28 increases. Since the light absorption in the TiO$_2$ photocatalyst layer 30 is decreased, the entire TiO$_2$ photocatalyst layer 30 having a large area and a large thickness can be uniformly activated. Thus, by controlling the thickness of the buffer layer 28 to a range which is smaller than the wavelength of the excitation light for the photocatalyst, the optimum condition for uniformly activating the entire TiO$_2$ photocatalyst layer 30 having a large area and a large thickness can be selected.

The thickness of the PMMA light guide layer 26 is larger than the thickness of the TiO$_2$ photocatalyst layer 30 and the wavelength of the excitation light emitted from the GaN semiconductor laser 32 is approximately 400 nm, that is, near the absorption end corresponding to the band gap of the TiO$_2$ photocatalyst layer 30; hence, light absorption in the TiO$_2$ photocatalyst layer 30 can be reduced. Thus, the entire TiO$_2$ photocatalyst layer 30 having a large area and a large thickness can be uniformly activated with high efficiency.

Since the GaN semiconductor laser 32, the collimating lens 34 and the prism 36 are placed in contiguity with each other on the TiO$_2$ photocatalyst layer 30, and the highly directional excitation light is emitted from the GaN semiconductor laser 32 and is incident on the PMMA light guide layer 26 without loss. Since there is no medium causing light absorption or scattering, such as air or moisture, therebetween, the optical power from the GaN semiconductor laser 32 can be used with significantly high efficiency without loss of the luminous intensity due to light absorption and scattering.

Since this apparatus is not affected by external environments as in the first embodiment, unlike the use of solar light as the excitation light for the photocatalyst, the $TiO_2$ photocatalyst layer 30 shows stable photocatalytic effects. The excitation light is not radiated towards the exterior of the apparatus when the light passes through the GaN semiconductor laser 32, the PMMA light guide layer 26 and the $TiO_2$ photocatalyst layer 30. When the photocatalyst excitation apparatus 20 is used in products, in which people view for a long time, such as a Braun-tube screen of a television set and a windshield of an automobile, the effects on human bodies, and particularly the probability of melanoma carcinogenesis will be negligible. Since the GaN semiconductor laser 32 is placed on the $TiO_2$ photocatalyst layer 30, the photocatalyst excitation apparatus 20 does not require an independent space for the light source. Thus, the photocatalyst excitation apparatus 20 can be made compact, the usable range of the photocatalyst excitation apparatus is expanded, and the esthetics thereof is substantially maintained.

Third Embodiment

Figure 3:
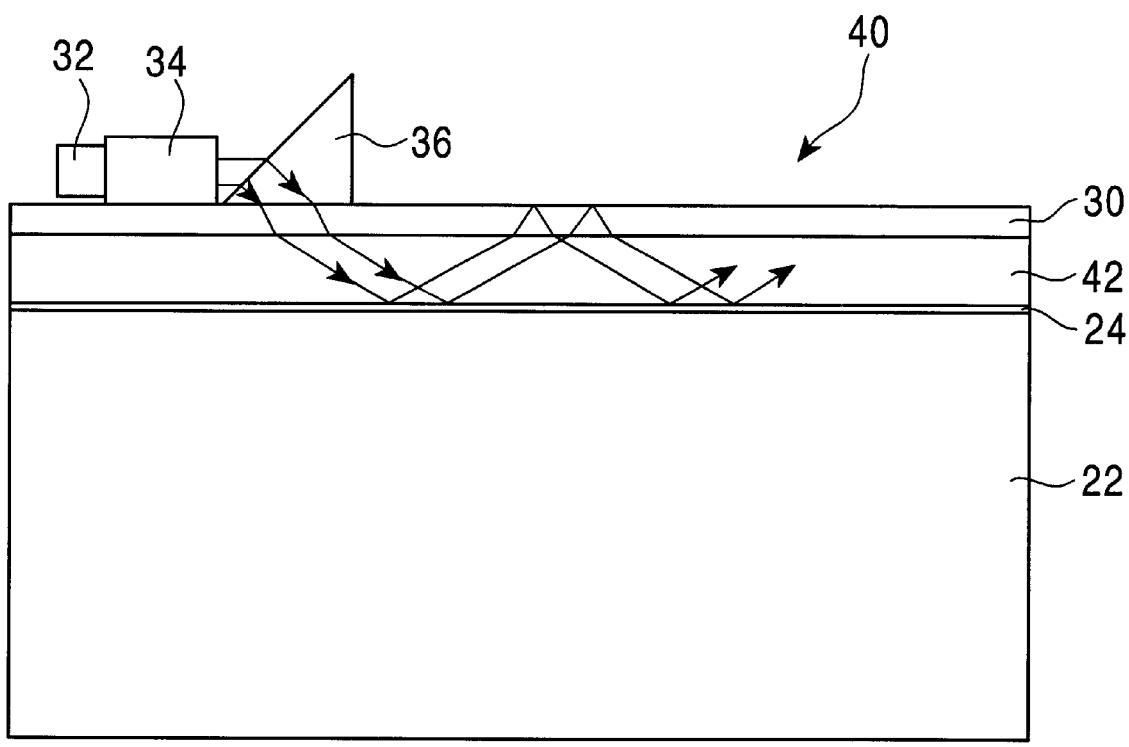
FIG. 3 is a cross-sectional view of a photocatalyst excitation apparatus in accordance with a third embodiment of the present invention.

FIG. 3 is a cross-sectional view of a photocatalyst excitation apparatus in accordance with a third embodiment of the present invention. The elements, which are the same as those in the photocatalyst excitation apparatus 20 shown in FIG. 2, are referred to with the same reference numerals without description.

As shown in FIG. 3, in a photocatalyst excitation apparatus 40 in accordance with this embodiment, a polyimide light guide layer composed of a fluorinated polyimide is formed instead of the PMMA light guide layer 26 in the photocatalyst excitation apparatus 20 in the second embodiment, and thus the buffer layer 28 is removed.

That is, a buffer layer 24 composed of a perfluorocompound transmitting the excitation light is formed on an opaque ceramic substrate 22 which has surface irregularities larger than the wavelength of the excitation light to form a smooth surface so that the thickness of the buffer layer 24 is sufficiently higher than the wavelength of the excitation light for the photocatalyst.

A polyimide light guide layer 42 is formed on the buffer layer 24. An anatase $TiO2$ photocatalyst layer 30 is formed directly on the light guide layer 42.

A GaN semiconductor laser 32 as a light source is placed on the $TiO_2$ photocatalyst layer 30, a collimating lens 34 is placed on the $TiO_2$ photocatalyst layer 30 so as to come into close contact with the radiating aperture of the GaN semiconductor laser 32, and a prism 36 is placed in contiguity with the collimating lens 34 on the $TiO_2$ photocatalyst layer 30.

The refractive index of the buffer layer 24 is lower than the refractive index of the PMMA light guide layer 26, the refractive index of the polyimide light guide layer 42 is 1.7, and the refractive index of the $TiO_2$ photocatalyst layer 30 is 2.5. Thus, a layered structure including the buffer layer 24, the polyimide light guide layer 42 and the $TiO_2$ photocatalyst layer 30, and an air layer in contact with the $TiO_2$ photocatalyst layer 30 can be considered to be a multimodal four-layer step-type slab light guide.

The operation of the photocatalyst excitation apparatus 40 shown in FIG. 3 will now be described.

Light having a wavelength near the absorption end corresponding to the band gap of the $TiO_2$ photocatalyst layer 30, that is, light having a wavelength of approximately 400 nm is emitted as excitation light for the photocatalyst from the radiating aperture of the GaN semiconductor laser 32 placed on the $TiO_2$ photocatalyst layer 30. The excitation light is collimated through the collimating lens 34 and is incident on the prism 36. The excitation light incident on the prism 36 is refracted as shown by the arrow in FIG. 3 and is incident on the polyimide light guide layer 42 via the $TiO_2$ photocatalyst layer 30.

The 400-nm excitation light travels through the polyimide light guide layer 42 which is considered to be a four-layer step-type slab light guide. That is, the excitation light passes through the $Ta_2O_5$ light guide layer 14 while repeating total reflection on the interfaces with the $TiO_2$ photocatalyst layer 30 and the buffer layer 24 sandwiching the polyimide light guide layer 42.

The leakage light from the polyimide light guide layer 42 is incident on the $TiO_2$ photocatalyst layer 30. That is, the $TiO_2$ photocatalyst layer 30 is irradiated with the excitation light from the entire rear face in contact with the polyimide light guide layer 42. The excitation light incident on the $TiO_2$ photocatalyst layer 30 travels through the $TiO_2$ photocatalyst layer 30 while repeating total reflection at the interface between the $TiO_2$ photocatalyst layer 30 and the external air layer.

The $TiO_2$ photocatalyst layer 30 irradiated with the excitation light from the entire rear face absorbs the excitation light for the photocatalyst and is activated. Thus, it has oxidative decomposition ability and antifouling properties against organic compounds due to photocatalytic effects.

In accordance with this embodiment, the polyimide light guide layer 42 is formed in place of the PMMA light guide layer 26 in the second embodiment, and the $TiO_2$ photocatalyst layer 30 is irradiated from the entire rear face with the leakage light when the excitation light emitted from the GaN semiconductor laser 32 placed on the $TiO_2$ photocatalyst layer 30 travels through the polyimide light guide layer 42; hence, benefits as in the second embodiment are achieved.

The PMMA light guide layer 26 in the second embodiment has a low heat-resisting temperature of approximately 80° C., and is not durable in high-temperature treatment, whereas the polyimide light guide layer 42 has a higher heat-resisting temperature of approximately 300° C., is durable in high-temperature treatment, and is not oxidized by the $TiO_2$ photocatalyst layer 30 due to nonflammability. Thus, the $TiO_2$ photocatalyst layer 30 can be directly formed on the polyimide light guide layer 42 without providing the buffer layer 28 in the second embodiment. Accordingly, the configuration of and the process for making the photocatalyst excitation apparatus 40 in accordance with the present invention can be simplified. Since the $TiO_2$ photocatalyst layer 30 can be formed on the polyimide light guide layer 42 by a high-temperature process, adhesion of the $TiO_2$ photocatalyst layer 30 is enhanced, and thus the reliability of the photocatalyst excitation apparatus 40 is improved.

Fourth Embodiment

Figure 4:
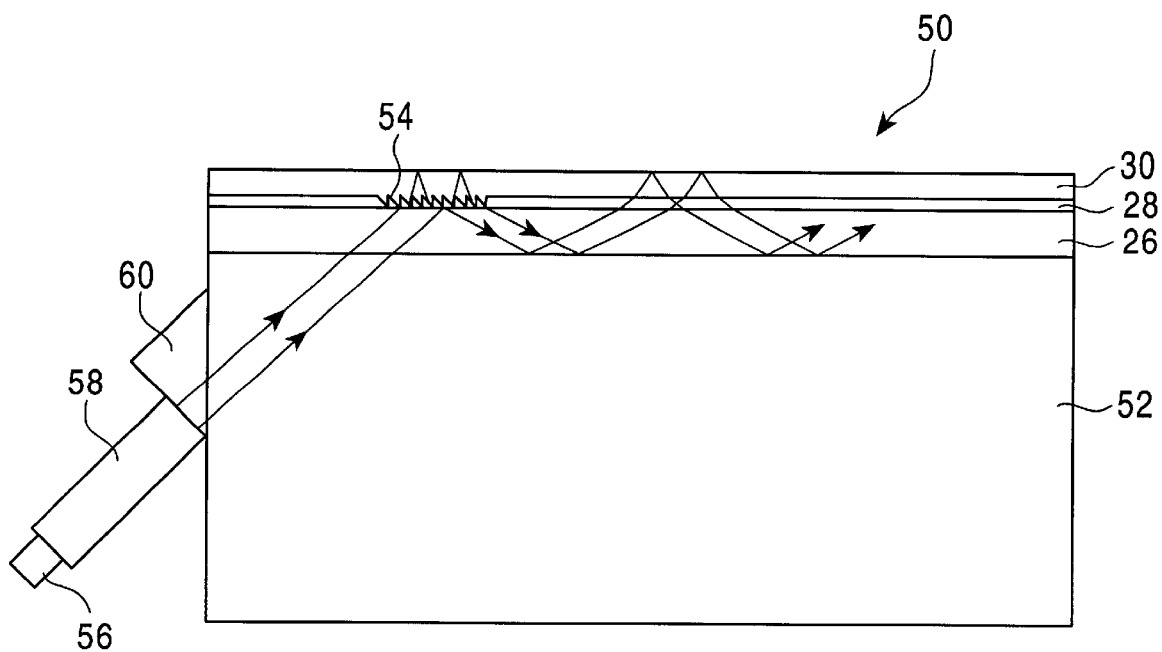
FIG. 4 is a cross-sectional view of a photocatalyst excitation apparatus in accordance with a fourth embodiment of the present invention.

FIG. 4 is a cross-sectional view of a photocatalyst excitation apparatus in accordance with a fourth embodiment of the present invention. The elements, which are the same as those in the photocatalyst excitation apparatus 20 shown in FIG. 2, are referred to with the same reference numerals without description.

As shown in FIG. 4, in a photocatalyst excitation apparatus 50 in accordance with this embodiment, a PMMA light guide layer 26 is formed on a transparent synthetic quartz substrate 52, and a buffer layer 28 composed of an nonoxidizing resin is formed on the PMMA light guide layer 26 so that the thickness of the buffer layer 28 is sufficiently smaller than the wavelength of the excitation light. An anatase $TiO_2$ photocatalyst layer 30 is formed on the buffer layer 28. A blazed grating 54 is formed at a portion of the interface between the buffer layer 28 and the $TiO_2$ photocatalyst layer 30.

A LED 56 as a light source is placed so that the radiating aperture thereof comes into close contact with a collimating lens 58. The collimating lens 58 comes into close contact with a prism 60, and the prism 60 comes into close contact with the end face of the synthetic quartz substrate 52.

The refractive index of the synthetic quartz substrate 52 is 1.5, the refractive index of the PMMA light guide layer 26 is 1.5, the refractive index of the buffer layer 28 is lower than the refractive index of the PMMA light guide layer 26, and the refractive index of the $TiO_2$ photocatalyst layer 30 is 2.5. Thus, a layered structure including the synthetic quartz substrate 52, the PMMA light guide layer 26, the buffer layer 28 and the $TiO_2$ photocatalyst layer 30, and an air layer in contact with the $TiO_2$ photocatalyst layer 30 can be considered to be a multimodal five-layer step-type slab light guide.

The pitch in the blazed grating 54 satisfies the following two conditions. When the excitation light emitted from the LED 56 is incident on the PMMA light guide layer 26, the incident light is diffracted by the blazed grating 54 towards the $TiO_2$ photocatalyst layer 30 and is totally reflected by the interface of the $TiO_2$ photocatalyst layer 30 and the air layer. The totally reflected excitation light is incident on the blazed grating 54 again, is diffracted towards the PMMA light guide layer 26, and is totally reflected by the interface of the PMMA light guide layer 26 and the synthetic quartz substrate 52.

The blazed grating 54 is formed by pressing a mold having a grating pattern of a given pitch onto the surface of the buffer layer 28 before curing the PMMA light guide layer 26.

The operation of the photocatalyst excitation apparatus 50 shown in FIG. 4 will now be described.

Light having a wavelength near the absorption end corresponding to the band gap of the $TiO_2$ photocatalyst layer 30, that is, light having a wavelength of approximately 400 nm is emitted as excitation light for the photocatalyst from the radiating aperture of the LED 56 placed on the end face of the synthetic quartz substrate 52 with collimating lens 58 and the prism 60 therebetween. The light is collimated through the collimating lens 58, passes through the prism 60, the synthetic quartz substrate 52, the PMMA light guide layer 26 and the buffer layer 28, and is incident on the blazed grating 54 formed at a portion of the interface between the buffer layer 28 and the $TiO_2$ photocatalyst layer 30.

The excitation light incident on the blazed grating 54 is diffracted by the blazed grating 54 towards the $TiO_2$ photocatalyst layer 30 and is totally reflected by the interface of the $TiO_2$ photocatalyst layer 30 and the air layer. The totally reflected excitation light is incident on the blazed grating 54 again, is diffracted towards the PMMA light guide layer 26, and passes through the PMMA light guide layer 26 which is considered to be a multimodal five-layer step-type slab light guide as a whole. That is, the excitation light travels through the $Ta_2O_5$ light guide layer 14 while repeating total reflection at the two interfaces with the $TiO_2$ photocatalyst layer 30 and the synthetic quartz substrate 52 sandwiching the PMMA light guide layer 26.

Since the thickness of the buffer layer 28 disposed between the PMMA light guide layer 26 and the $TiO_2$ photocatalyst layer 30 is sufficiently smaller than the wavelength of the excitation light, the buffer layer 28 can transmit the excitation light for the photocatalyst without total reflection at the interface with the PMMA light guide layer 26 even if the refractive index thereof is lower than the refractive index of the PMMA light guide layer 26.

The leakage light from the PMMA light guide layer 26 is incident on the $TiO_2$ photocatalyst layer 30. That is, the $TiO_2$ photocatalyst layer 30 is irradiated with the excitation light having a wavelength of approximately 400 nm from the entire rear face in contact with the PMMA light guide layer 26 with the buffer layer 28 therebetween. The excitation light incident on the $TiO_2$ photocatalyst layer 30 travels through the $TiO_2$ photocatalyst layer 30 while repeating total reflection at the interface between the $TiO_2$ photocatalyst layer 30 and the external air layer.

The $TiO_2$ photocatalyst layer 30 irradiated with the excitation light from the entire rear face absorbs the excitation light for the photocatalyst and is activated. Thus, it has oxidative decomposition ability and antifouling properties against organic compounds due to photocatalytic effects.

In accordance with this embodiment, the $TiO_2$ photocatalyst layer 30 is irradiated with the excitation light from the entire rear face when the excitation light travels through the PMMA light guide layer 26, as in the second embodiment; hence this embodiment has the same advantages as those of the second embodiment.

Since the blazed grating 54 is formed at a portion of the interface between the buffer layer 28 and the $TiO_2$ photocatalyst layer 30, the excitation light emitted from the LED 56, which is placed on the end face of the synthetic quartz substrate 52 with the prism 60, passes through the prism 60 and the synthetic quartz substrate 52, is incident on the blazed grating 54, and is diffracted by the grating 54 towards the $TiO_2$ photocatalyst layer 30. The excitation light can be introduced into and can pass through the $TiO_2$ photocatalyst layer 30 readily and stably.

In this embodiment, the blazed grating 54 is formed at a portion of the interface between the buffer layer 28 and the $TiO_2$ photocatalyst layer 30. Alternatively, a blazed grating may be formed at a portion of the interface between the PMMA light guide layer 26 and the buffer layer 28 or at a portion of the interface between the synthetic quartz substrate 52 and the PMMA light guide layer 26. A Bragg grating may be used in place of the blazed grating 62. The Bragg grating may be formed on any one of the synthetic quartz substrate 52, the PMMA light guide layer 26, the buffer layer 2 and the $TiO_2$ photocatalyst layer 30.

In this embodiment, the excitation light is emitted from the LED 56 placed on the end face of the synthetic quartz substrate 52 with the collimating lens 58 and the prism 60, and is incident on the blazed grating 54 via the synthetic quartz substrate 52, etc. Alternatively, the LED may be placed with the collimating lens and the prism on the $TiO_2$ photocatalyst layer 30 as in the second and third embodiments, so that the excitation light emitted from the LED is incident on the upper face of the $TiO_2$ photocatalyst layer 30 towards the blazed grating 54.

Fifth Embodiment

Figure 5:
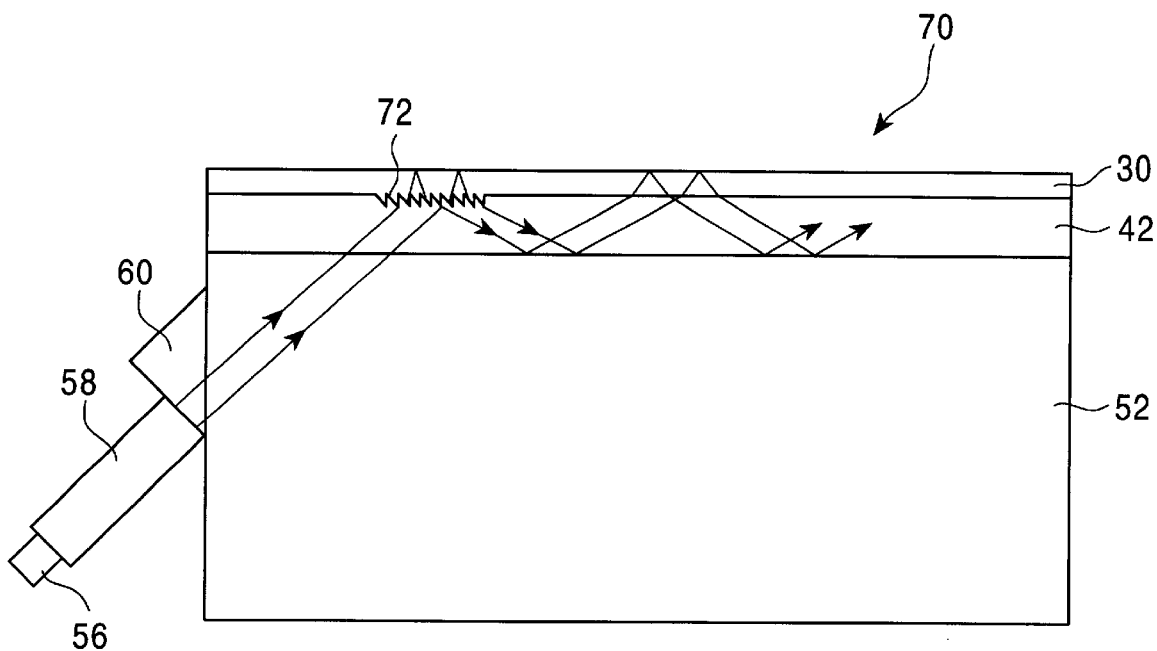
FIG. 5 is a cross-sectional view of a photocatalyst excitation apparatus in accordance with a fifth embodiment of the present invention.
Figure 6:
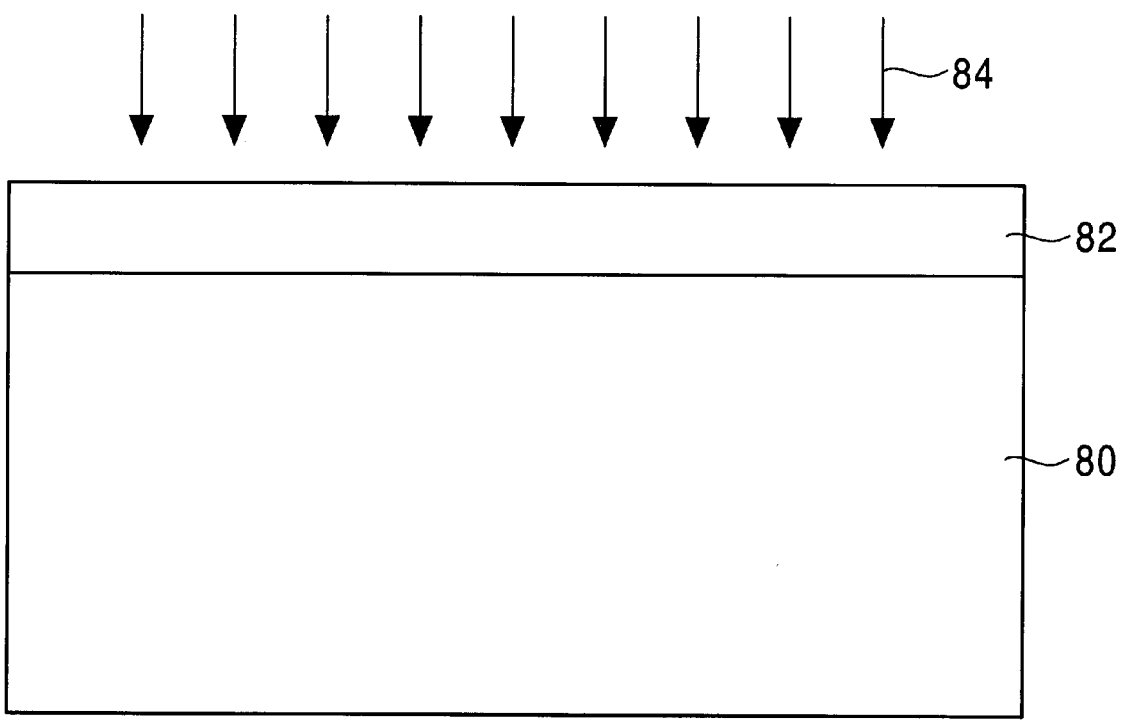
FIG. 6 is a cross-sectional view of a conventional photocatalyst excitation apparatus.

FIG. 5 is a cross-sectional view of a photocatalyst excitation apparatus in accordance with a fifth embodiment of the present invention. The elements, which are the same as those in the photocatalyst excitation apparatuses 30 and 40 shown in FIGS. 3 and 4, are referred to with the same reference numerals without description.

As shown in FIG. 5, in a photocatalyst excitation apparatus 70 in accordance with this embodiment, a polyimide light guide layer composed of a fluorinated polyimide is formed instead of the PMMA light guide layer 26 in the photocatalyst excitation apparatus 40 in the fourth embodiment, and thus the buffer layer 28 is not provided.

A polyimide light guide layer 42 is formed on a transparent synthetic quartz substrate 52, and anatase $TiO_2$ photocatalyst layer 30 is formed on the polyimide light guide layer 42. A blazed grating 72 is formed at a portion of the interface between the polyimide light guide layer 42 and the $TiO_2$ photocatalyst layer 30.

A LED 56 as a light source is placed so that the radiating aperture thereof comes into close contact with a collimating lens 58. The collimating lens 58 comes into close contact with a prism 60, and the prism 60 comes into close contact with the end face of the synthetic quartz substrate 52.

The refractive index of the synthetic quartz substrate 52 is 1.5, the refractive index of the polyimide light guide layer 42 is 1.7, and the refractive index of the $TiO_2$ photocatalyst layer 30 is 2.5. Thus, a layered structure including the synthetic quartz substrate 52, the polyimide light guide layer 42 and the $TiO_2$ photocatalyst layer 30, and an air layer in contact with the $TiO_2$ photocatalyst layer 30 can be considered to be a multimodal four-layer step-type slab light guide.

The pitch in the blazed grating 72 satisfies the following two conditions. When the excitation light is incident on the polyimide light guide layer 42, the incident light is diffracted by the blazed grating 72 towards the $TiO_2$ photocatalyst layer 30 and is totally reflected by the interface of the $TiO_2$ photocatalyst layer 30 and the air layer. The totally reflected excitation light is incident on the blazed grating 72 again, is diffracted towards the polyimide light guide layer 42, and is totally reflected by the interface of the polyimide light guide layer 42 and the synthetic quartz substrate 52.

The blazed grating 72 is formed by pressing the mold having a grating pattern with a given pitch onto the surface of the uncured polyimide light guide layer 42.

The operation of the photocatalyst excitation apparatus 70 shown in FIG. 5 will now be described.

Light having a wavelength near the absorption end corresponding to the band gap of the $TiO_2$ photocatalyst layer 30, that is, light having a wavelength of approximately 400 nm is emitted as excitation light for the photocatalyst from the radiating aperture of the LED 56 placed on the end face of the synthetic quartz substrate 52 with collimating lens 58 and the prism 60 therebetween. The light is collimated through the collimating lens 58, passes through the prism 60, the synthetic quartz substrate 52 and the polyimide light guide layer 42, and is incident on the blazed grating 72 formed at a portion of the interface between the polyimide light guide layer 42 and the $TiO_2$ photocatalyst layer 30.

The excitation light is diffracted by the blazed grating 72, is incident on the polyimide light guide layer 42, and passes through the polyimide light guide layer 42 which is considered to be a multimodal four-layer step-type slab light guide. That is, the excitation light travels through the polyimide light guide layer 42 while repeating total reflection at the two interfaces with the $TiO_2$ photocatalyst layer 30 and the synthetic quartz substrate 52 sandwiching the polyimide light guide layer 42.

The leakage light from the polyimide light guide layer 42 is incident on the $TiO_2$ photocatalyst layer 30. That is, the $TiO_2$ photocatalyst layer 30 is irradiated with the 400-nm excitation light from the entire rear face in contact with the polyimide light guide layer 42. The incident excitation light travels through the $TiO_2$ photocatalyst layer 30 while repeating total reflection at the interface between the $TiO_2$ photocatalyst layer 30 and the external air layer.

The $TiO_2$ photocatalyst layer 30 irradiated with the excitation light from the entire rear face absorbs the excitation light and is activated. Thus, it has oxidative decomposition ability and antifouling properties against organic compounds due to photocatalytic effects.

The polyimide light guide layer 42, which has a higher heat-resisting temperature, is durable in high-temperature treatment, and is not flammable, is formed in place of the PMMA light guide layer 26 in the fourth embodiment. The $TiO_2$ photocatalyst layer 30 is irradiated with the excitation light, which leaks when it travels through the polyimide light guide layer 42, from the entire rear face; hence, this embodiment shows the same advantages as those of the third embodiment.

Since the blazed grating 72 is formed at a portion of the interface between the polyimide light guide layer 42 and the $TiO_2$ photocatalyst layer 30, the excitation light is incident on and travels through the $TiO_2$ photocatalyst layer 30 readily and stably, as in the fourth embodiment.

In this embodiment, the blazed grating 72 is formed at a portion of the interface between the polyimide light guide layer 42 and the $TiO_2$ photocatalyst layer 30. Alternatively, a blazed grating may be formed at a portion of the interface between the synthetic quartz substrate 52 and the polyimide light guide layer 42. A Bragg grating may be used in place of the blazed grating 72. The Bragg grating may be formed on any one of the synthetic quartz substrate 52, the polyimide light guide layer 42 and the $TiO_2$ photocatalyst layer 30.

In this embodiment, the excitation light for the photocatalyst is emitted from the LED 56 placed on the end face of the synthetic quartz substrate 52 with the collimating lens 58 and the prism 60, and is incident on the blazed grating 72 via the synthetic quartz substrate 52, etc. Alternatively, the LED may be placed with the collimating lens and the prism on the $TiO_2$ photocatalyst layer 30 as in the second and third embodiments, so that the excitation light emitted from the LED is incident on the upper face of the $TiO_2$ photocatalyst layer 30 towards the blazed grating 72.

What is claimed is:

1. A photocatalyst excitation apparatus, comprising:

a substrate;

a light guide layer formed on the substrate and having an end face;

a light source for emitting excitation light for a photocatalyst towards the light guide layer; and a photocatalyst layer formed on the light guide layer, the excitation light emitted from the light source passing through the light guide layer and leakage light from the light guide layer activating the photocatalyst layer, wherein the light source comes into close contact with the end face of the light guide layer, and wherein the wavelength of the excitation light emitted from the light source is a wavelength near the absorption edge corresponding to the band gap of the photocatalyst layer.

2. A photocatalyst excitation apparatus comprising:

a substrate;

a light guide layer formed on the substrate;

a light source for emitting excitation light for a photocatalyst towards the light guide layer; and a photocatalyst layer formed on the light guide layer, the excitation light emitted from the light source passing through the light guide layer and leakage light from the light guide layer activating the photocatalyst layer, wherein the wavelength of the excitation light emitted from the light source is a wavelength near the absorption edge corresponding to the band gap of the photocatalyst layer, and wherein the light source is placed on the photocatalyst layer, and the excitation light for the photocatalyst emitted from the light source is incident on the light guide layer through a prism placed in contiguity with the light source on the photocatalyst layer.

3. A photocatalyst excitation apparatus comprising:

a substrate;

a light guide layer formed on the substrate;

a light source for emitting excitation light for a photocatalyst towards the light guide layer; and a photocatalyst layer formed on the light guide layer, the excitation light emitted from the light source passing through the light guide layer and leakage light from the light guide layer activating the photocatalyst layer, wherein the wavelength of the excitation light emitted from the light source is a wavelength near the absorption edge corresponding to the band gap of the photocatalyst layer, and wherein the light source comes into close contact with the end face of the substrate with a prism provided therebetween, the excitation light emitted from the light source is incident on the light guide layer through the prism.

4. A photocatalyst excitation apparatus according to either claim 2 or 3, wherein one of the substrate, the light guide layer and the photocatalyst layer is provided with a grating, and the excitation light emitted from the light source is diffracted by the grating and is incident on the light guide layer.

5. A photocatalyst excitation apparatus according to any one of claims 1 to 3, wherein the light source is selected from a semiconductor laser and a light emitting diode.

6. A photocatalyst excitation apparatus comprising:

a substrate;

a light guide layer formed on the substrate;

a light source for emitting excitation light for a photocatalyst towards the light guide layer; and a photocatalyst layer formed on the light guide layer, the excitation light emitted from the light source passing through the light guide layer and leakage light from the light guide layer activating the photocatalyst layer, wherein a first buffer layer transmitting the excitation light and having a refractive index which is lower than that of the light guide layer is disposed between the substrate and the light guide layer.

7. A photocatalyst excitation apparatus according to claim 6, wherein one of the substrate, the first buffer layer, the light guide layer and the photocatalyst layer is provided with a grating, and the excitation light emitted from the light source is diffracted by the grating and is incident on the light guide layer.

8. A photocatalyst excitation apparatus comprising:

a substrate;

a light guide layer formed on the substrate;

a light source for emitting excitation light for a photocatalyst towards the light guide layer; and a photocatalyst layer formed on the light guide layer, the excitation light emitted from the light source passing through the light guide layer and leakage light from the light guide layer activating the photocatalyst layer, wherein a buffer layer transmitting the excitation light and comprising an nonoxidizing material is disposed between the light guide layer and the photocatalyst layer.

9. A photocatalyst excitation apparatus according to claim 8, wherein one of the substrate, the light guide layer, the buffer layer and the photocatalyst layer is provided with a grating, and the excitation light emitted from the light source is diffracted by the grating and is incident on the light guide layer.

10. A photocatalyst excitation apparatus comprising:

a substrate;

a light guide layer formed on the substrate;

a light source for emitting excitation light for a photocatalyst towards the light guide layer; and a photocatalyst layer formed on the light guide layer, the excitation light emitted from the light source passing through the light guide layer and leakage light from the light guide layer activating the photocatalyst layer, wherein a buffer layer transmitting the excitation light, having a thickness which is smaller than or the same as the wavelength of the excitation light for the photocatalyst, and having a refractive index which is lower than that of the light guide layer is disposed between the light guide layer and the photocatalyst layer.

11. A photocatalyst excitation apparatus according to claim 10, wherein one of the substrate, the light guide layer, the buffer layer and the photocatalyst layer is provided with a grating, and the excitation light emitted from the light source is diffracted by the grating and is incident on the light guide layer.

12. A photocatalyst excitation apparatus according to any one of claims 1, 2, 3, 6, 8 and 10, wherein the length of the light guide layer is greater than the thickness of the photocatalyst layer.

13. A photocatalyst excitation apparatus according to any one of claims 6, 8 and 10, wherein the wavelength of the excitation light emitted from the light source is a wavelength near the absorption edge corresponding to the band gap of the photocatalyst layer.

* * * * *